United States Patent
Yuan et al.

(10) Patent No.: US 12,273,164 B2
(45) Date of Patent: Apr. 8, 2025

(54) CO-PHASING FACTOR INDICATION IN DOWNLINK CONTROL INFORMATION

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/759,571

(22) PCT Filed: Jan. 31, 2020

(86) PCT No.: PCT/CN2020/074103
§ 371 (c)(1),
(2) Date: Jul. 27, 2022

(87) PCT Pub. No.: WO2021/151243
PCT Pub. Date: Aug. 5, 2021

(65) Prior Publication Data
US 2023/0091465 A1    Mar. 23, 2023

(51) Int. Cl.
*H04B 7/0456* (2017.01)
*H04B 7/0404* (2017.01)
*H04B 7/06* (2006.01)
*H04W 72/232* (2023.01)

(52) U.S. Cl.
CPC ......... *H04B 7/0456* (2013.01); *H04B 7/0404* (2013.01); *H04B 7/0691* (2013.01); *H04W 72/232* (2023.01)

(58) Field of Classification Search
CPC .. H04B 7/0456; H04B 7/0404; H04B 7/0691; H04B 7/063; H04W 72/232
See application file for complete search history.

(56) References Cited

U.S. PATENT DOCUMENTS

2015/0195071 A1* 7/2015 Lunttila ............ H04L 25/03904
370/329
2016/0119097 A1    4/2016 Nam et al.
(Continued)

FOREIGN PATENT DOCUMENTS

CA       3035000 C  * 6/2022 ........... H04B 7/0404
CN    106233640 A    12/2016
(Continued)

OTHER PUBLICATIONS

Machine translation of KR-20150113933-A. (Year: 2023).*
(Continued)

*Primary Examiner* — Jean B Corrielus
(74) *Attorney, Agent, or Firm* — Harrity & Harrity LLP/QUALCOMM Incorporated

(57) ABSTRACT

Various aspects of the present disclosure generally relate to wireless communication. In some aspects, a user equipment (UE) may receive downlink control information that identifies multiple precoder indicators and at least one co-phasing factor indicator for generating a co-phased joint transmission using multiple antenna panels. The UE may determine precoders for the multiple antenna panels based at least in part on the multiple precoder indicators and the at least one co-phasing factor indicator. The UE may communicate by joint transmission using the multiple antenna panels according to the determined precoders. Numerous other aspects are provided.

50 Claims, 5 Drawing Sheets

(56) References Cited

U.S. PATENT DOCUMENTS

| | | | |
|---|---|---|---|
| 2018/0254813 A1* | 9/2018 | Gao | H04B 7/0632 |
| 2020/0052804 A1* | 2/2020 | Hao | H04B 17/309 |
| 2020/0204231 A1* | 6/2020 | Tong | H04L 25/03904 |
| 2021/0281448 A1* | 9/2021 | Li | H04L 5/0051 |
| 2023/0052449 A1 | 2/2023 | Yuan et al. | |

FOREIGN PATENT DOCUMENTS

| | | |
|---|---|---|
| CN | 107925464 A | 4/2018 |
| CN | 107925466 A | 4/2018 |
| EP | 3562052 A1 | 10/2019 |

OTHER PUBLICATIONS

Huawei, et al., "Design and Evaluation Results for Type I Codebook", 3GPP TSG RAN WG1 Meeting #89, R1-1708138, Hangzhou, China, May 15-19, 2017 (May 19, 2017) sections 1,3, 11 Pages.

Huawei, et al., "DL Codebook Design for Multi-Panel Structured MIMO in NR", 3GPP TSG RAN WG1 Meeting #88, R1-1701691, Athens, Greece, Feb. 13-17, 2017 (Feb. 17, 2017), 6 Pages, the whole document.

International Search Report and Written Opinion—PCT/CN2020/074103—ISA/EPO—dated Oct. 27, 2020.

ZTE: "Codebook based UL Transmission", 3GPP TSG RAN WG1 Meeting #90, R1-1712285, Prague, Czechia, Aug. 21, 2017-Aug. 25, 2017, Aug. 25, 2017 (Aug. 25, 2017) sections 1-2, pp. 1-5.

ETSI TS 138 212, V15.5.0: "5G, NR, Multiplexing and Channel Coding (3GPP TS 38.212 Version 15.5.0 Release 15)", May 2019, 104 Pages, Tables 7.3.1.1.2-31 and 7.3.1.1.2-2.

ETSI TS 138.211, Version 15.5.0: "5G, NR, Physical Channels and Modulation (3GPP TS 38.211 Version 15.5.0 Release 15)", ETSI Technical Specification, European Telecommunications Standards Institute (ETSI), 650, Route Des Lucioles, F-06921 Sophia-Antipolis, France, vol. 3GPP Ran, No. V15.5.0, Apr. 30, 2019, 98 Pages, XP014345019, Section 6.3.3.2, Table 6.3.1.5-3.

Supplementary European Search Report—EP20917236—Search Authority—Munich—Oct. 5, 2023.

* cited by examiner

CO-PHASING FACTOR INDICATION IN DOWNLINK CONTROL INFORMATION

CROSS-REFERENCE TO RELATED APPLICATION

This application is a 371 national stage of PCT Application No. PCT/CN2020/074103 filed on Jan. 31, 2020, entitled "CO-PHASING FACTOR INDICATION IN DOWNLINK CONTROL INFORMATION," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for co-phasing factor indication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving downlink control information (DCI) that identifies multiple precoder indicators and at least one co-phasing factor indicator for generating a co-phased joint transmission using multiple antenna panels. The method may include determining precoders for the multiple antenna panels based at least in part on the multiple precoder indicators and the at least one co-phasing factor indicator. The method may include communicating by joint transmission using the multiple antenna panels according to the determined precoders.

In some aspects, a method of wireless communication, performed by a base station (BS), may include determining multiple precoder indicators and at least one co-phasing factor indicator for a UE. The method may include transmitting DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator.

In some aspects, a UE for wireless communication may include memory and one or more processors coupled to the memory. The memory and the one or more processors may be configured to receive DCI that identifies multiple precoder indicators and at least one co-phasing factor indicator for generating a co-phased joint transmission using multiple antenna panels. The memory and the one or more processors may be configured to determine precoders for the multiple antenna panels based at least in part on the multiple precoder indicators and the at least one co-phasing factor indicator. The memory and the one or more processors may be configured to communicate by joint transmission using the multiple antenna panels according to the determined precoders.

In some aspects, a BS for wireless communication may include memory and one or more processors coupled to the memory. The memory and the one or more processors may be configured to determine multiple precoder indicators and at least one co-phasing factor indicator for a UE. The memory and the one or more processors may be configured to transmit DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator.

In some aspects, a non-transitory computer-readable medium may store one or more instructions for wireless communication. The one or more instructions, when executed by one or more processors of a UE, may cause the one or more processors to receive DCI that identifies multiple precoder indicators and at least one co-phasing factor indicator for generating a co-phased joint transmission using multiple antenna panels. The one or more instructions may cause the one or more processors to determine precoders for the multiple antenna panels based at least in part on the multiple precoder indicators and the at least one co-phasing factor indicator. The one or more instructions may cause the one or more processors to communicate by joint transmission using the multiple antenna panels according to the determined precoders.

In some aspects, a non-transitory computer-readable medium may store one or more instructions for wireless communication. The one or more instructions, when executed by one or more processors of a BS, may cause the one or more processors to determine multiple precoder indicators and at least one co-phasing factor indicator for a UE. The one or more instructions may cause the one or more processors to transmit DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator.

In some aspects, an apparatus for wireless communication may include means for receiving DCI that identifies multiple precoder indicators and at least one co-phasing factor indicator for generating a co-phased joint transmission using multiple antenna panels. The apparatus may include means for determining precoders for the multiple antenna panels based at least in part on the multiple precoder indicators and the at least one co-phasing factor indicator. The apparatus may include means for communicating by joint transmission using the multiple antenna panels according to the determined precoders.

In some aspects, an apparatus for wireless communication may include means for determining multiple precoder indicators and at least one co-phasing factor indicator for a UE. The apparatus may include means for transmitting DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
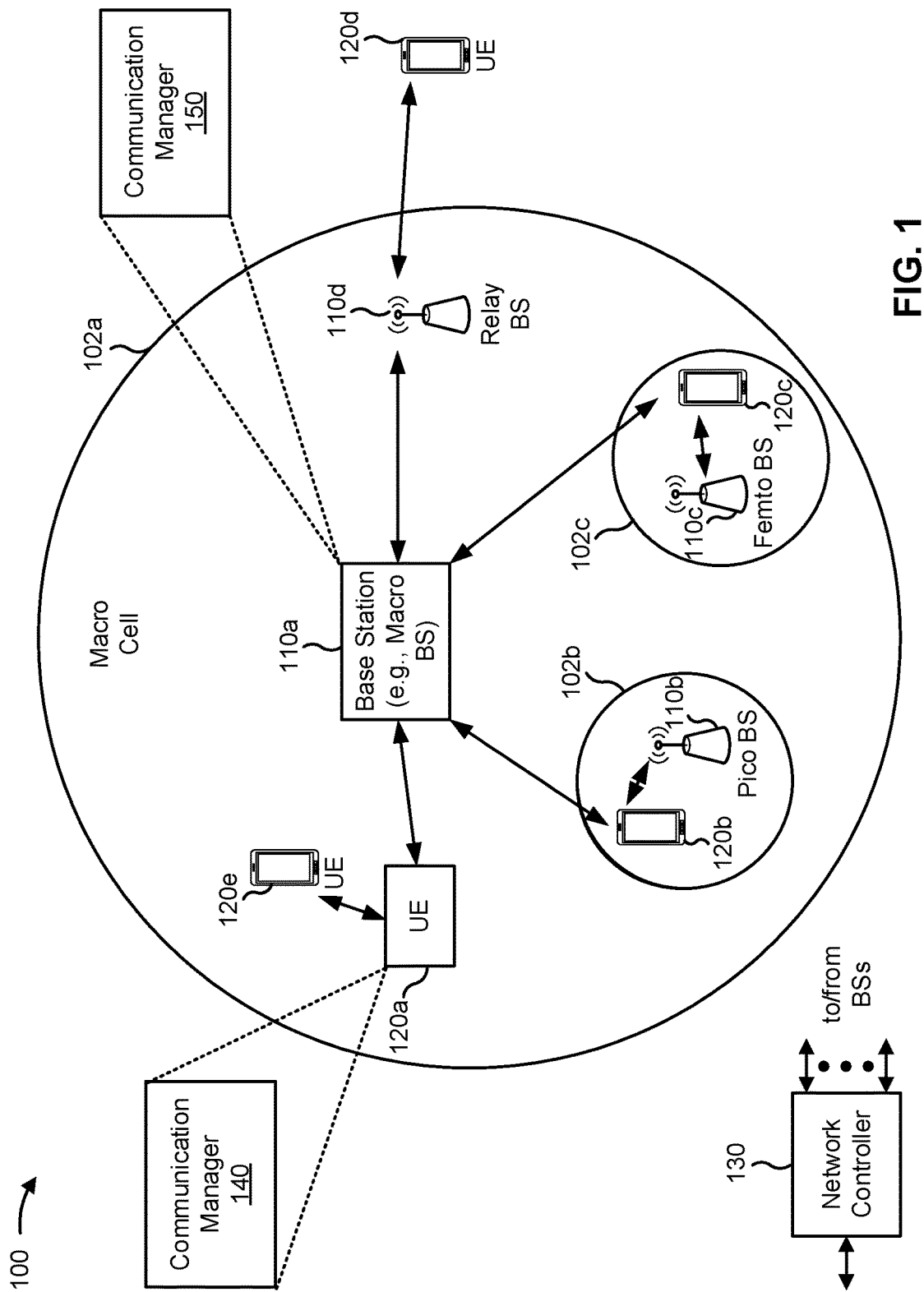
FIG. 1 is a block diagram conceptually illustrating an example of a wireless communication network, in accordance with various aspects of the present disclosure.

A base station (BS) may schedule or configure uplink transmissions for a user equipment (UE) (e.g., in a physical uplink shared channel (PUSCH)). For example, the BS may transmit downlink control information (DCI) that schedules an uplink transmission of the UE. In some cases, the uplink transmission may be a multi-panel transmission. For a multi-panel transmission, the UE may use multiple antenna panels to transmit an uplink communication, such as in a spatial division multiplexing, frequency division multiplexing, or time division multiplexing manner.

In some wireless communication systems, a joint transmission may not be enabled for a multi-panel transmission of a UE. In a joint transmission, a UE may transmit the same information on multiple antenna panels using coordinated beamforming. For example, the UE may concurrently transmit multiple layers of an uplink communication on two antenna panels. Moreover, when phases of the transmissions are aligned, the joint transmission may provide a stronger signal. Accordingly, joint transmission may improve uplink performance of a UE.

Some techniques and apparatuses described herein provide for joint transmission using multiple antenna panels of a UE. In some aspects, DCI scheduling a multi-panel transmission may identify a co-phasing factor indicator that enables a UE to generate a co-phased joint transmission using multiple antenna panels. In this way, uplink performance of the UE may be improved by the joint transmission.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with UEs and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, the UE 120 may include a communication manager 140. As described in more detail elsewhere herein, the communication manager 140 may receive DCI that identifies multiple precoder indicators and at least one co-phasing factor indicator for generating a co-phased joint transmission using multiple antenna panels, determine precoders for the multiple antenna panels based at least in part on the multiple precoder indicators and the at least one co-phasing factor indicator, and communicate by joint transmission using the multiple antenna panels according to the determined precoders. Additionally, or alternatively, the communication manager 140 may perform one or more other operations described herein.

Similarly, the base station 110 may include a communication manager 150. As described in more detail elsewhere herein, the communication manager 150 may determine multiple precoder indicators and at least one co-phasing factor indicator for a UE, and transmit DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator. Additionally, or alternatively, the communication manager 150 may perform one or more other operations described herein.

As indicated above, FIG. 1 is provided merely as an example. Other examples may differ from what is described with regard to FIG. 1.

Figure 2:
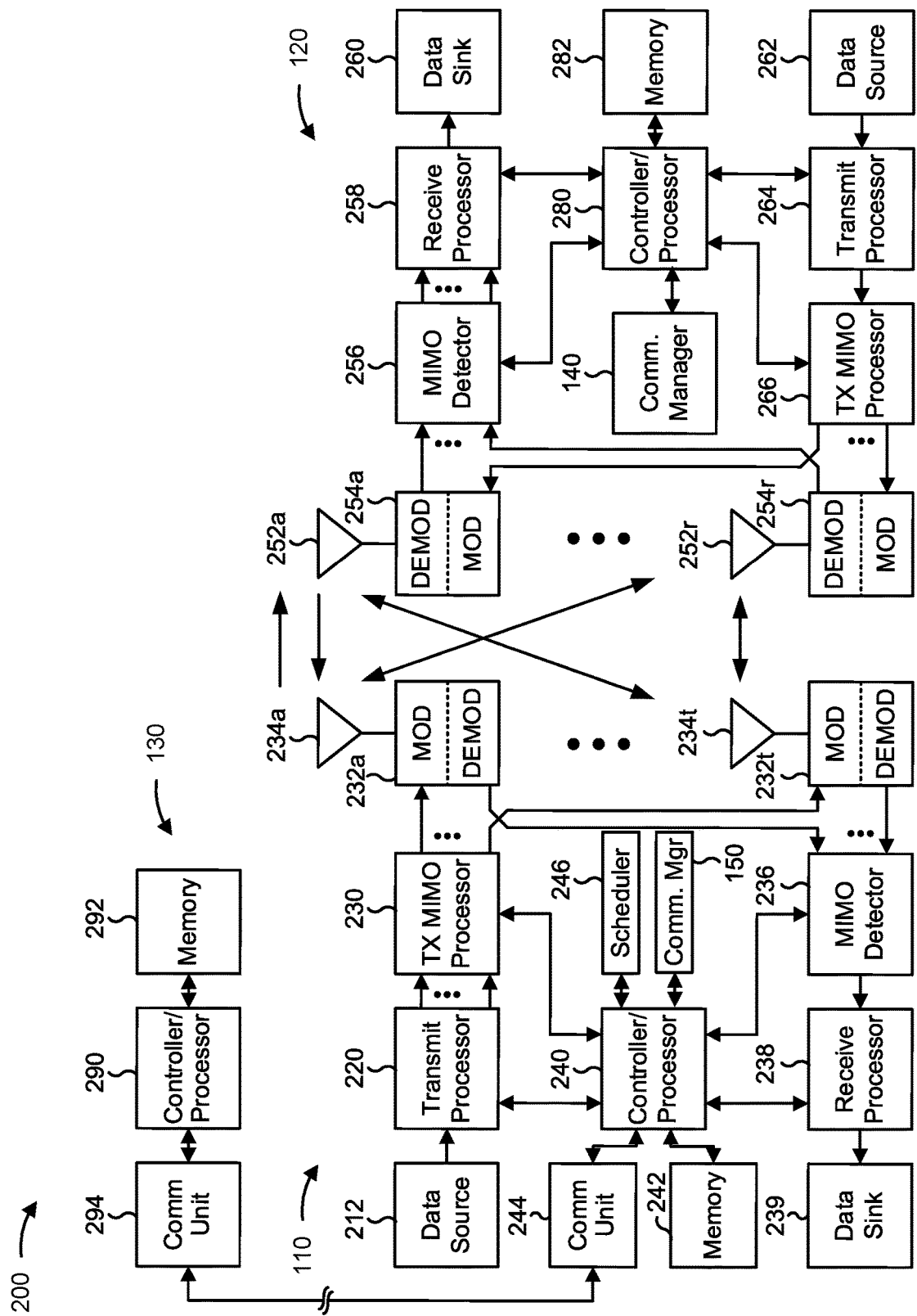
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with co-phasing factor indication in DCI, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 may include means for receiving DCI that identifies multiple precoder indicators and at least one co-phasing factor indicator for generating a co-phased joint transmission using multiple antenna panels, means for determining precoders for the multiple antenna panels based at least in part on the multiple precoder indicators and the at least one co-phasing factor indicator, means for communicating by joint transmission using the multiple antenna panels according to the determined precoders, and/or the like. Additionally, or alternatively, the UE 120 may include means for performing one or more other operations described herein. In some aspects, such means may include the communication manager 140. Additionally, or alternatively, such means may include one or more components of the UE 120 described in connection with FIG. 2.

In some aspects, the base station 110 may include means for determining multiple precoder indicators and at least one co-phasing factor indicator for a UE, means for transmitting DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator, and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

As indicated above, FIG. 2 is provided merely as an example. Other examples may differ from what is described with regard to FIG. 2.

As described above, in some wireless communication systems, joint transmission may not be enabled for a multi-panel transmission of a UE. A joint transmission may provide a stronger signal when phases of the transmissions are aligned (i.e., a co-phased joint transmission). Accordingly, joint transmission may improve uplink performance of a UE. Some techniques and apparatuses described herein provide for joint transmission of a multi-panel transmission of a UE. In some aspects, DCI scheduling a multi-panel transmission may identify a co-phasing factor indicator that enables a UE to generate a co-phased joint transmission using multiple antenna panels. In this way, uplink performance of the UE may be improved by the joint transmission.

Figure 3:
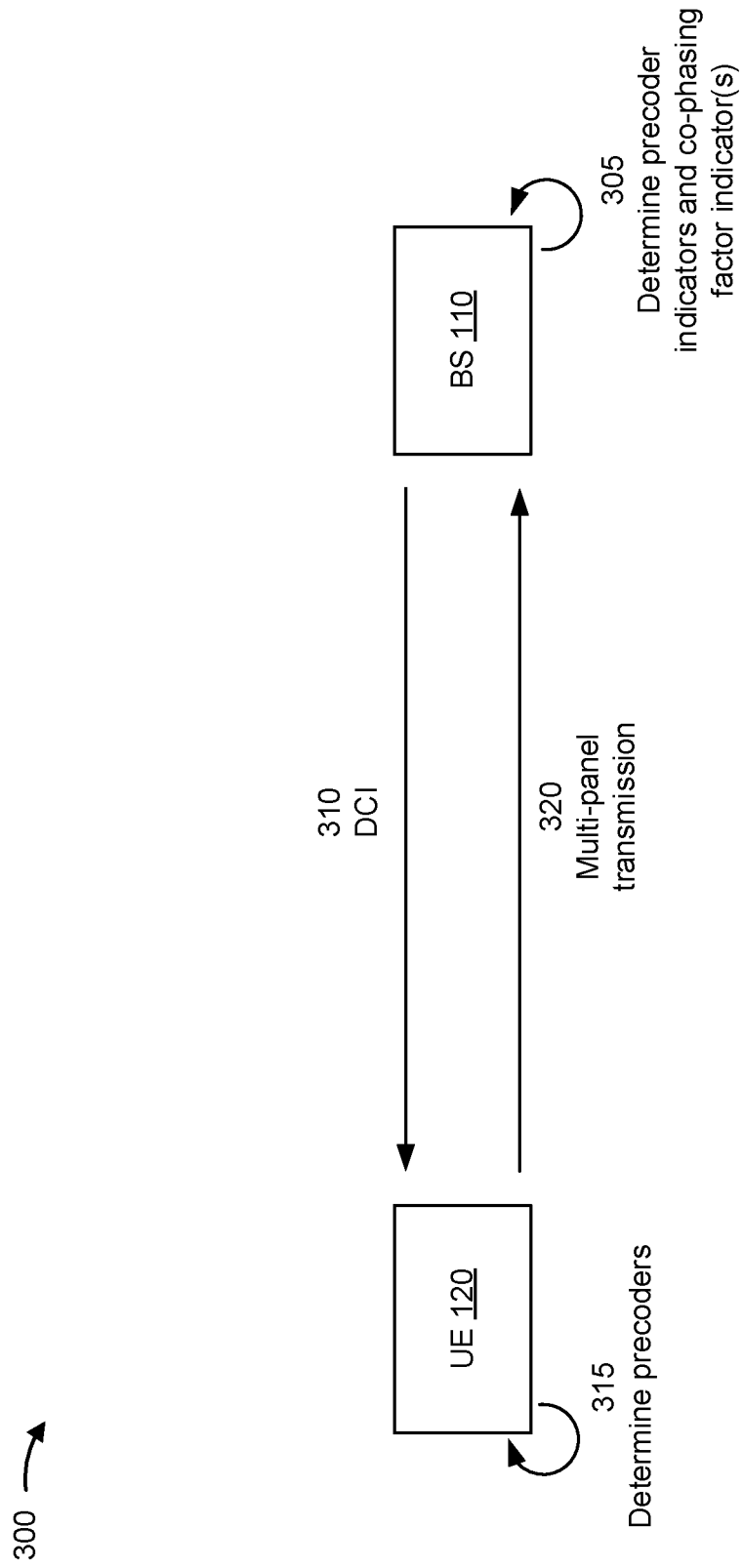
FIG. 3 is a diagram illustrating an example of co-phasing factor indication in downlink control information, in accordance with various aspects of the present disclosure.

FIG. 3 is a diagram illustrating an example 300 of co-phasing factor indication in DCI, in accordance with various aspects of the present disclosure. As shown in FIG. 3, a UE 120 and a BS 110 may communicate in connection with an uplink multi-panel transmission of the UE 120. In some aspects, the UE 120 may employ multiple transmit antenna panels.

As shown by reference number 305, the BS 110 may determine multiple precoder indicators, and at least one co-phasing factor indicator, that are to be used by the UE 120 for an uplink multi-panel transmission. A precoder indicator may identify a transmit precoder matrix indicator (TPMI) (e.g., for a codebook-based multi-panel transmission) or a sounding reference signal (SRS) resource indicator (SRI) (e.g., for a non-codebook-based multi-panel transmission). A co-phasing factor indicator may identify a co-phasing factor that defines a phase offset between precoders. Thus, when a co-phasing factor is applied to a first precoder, the first precoder may be phase-aligned with a second precoder.

In some aspects, a precoder indicator may be an index (e.g., an SRI index) of a mapping of indices to SRI combinations (e.g., combinations of 1, 2, 3, or 4 SRIs, where the quantity of SRIs in an SRI combination indicates a transmission rank (e.g., a quantity of layers)). As an example, an index of [7] may map to an SRI combination of [1, 2] (where precoders used to transmit SRS resources identified by 1 and 2 are to be used for a two-layer (i.e., a transmission rank of two) uplink transmission), an index of [12] may map to an SRI combination of [0, 2, 3] (where precoders used to transmit SRS resources identified by 0, 2, and 3 are to be used for a three-layer (i.e., a transmission rank of three) uplink transmission), and the like (additional examples are provided in 3GPP Technical Specification (TS) 38.212, such as in Table 7.3.1.1.2-31). A particular mapping of indices to SRI combinations that is to be used may be based at least in part on a quantity of SRSs configured for the UE 120.

In some aspects, a precoder indicator may be an index (e.g., a TPMI index) of a mapping of indices to transmission rank and TPMI combinations. As an example, an index of [9] may map to a transmission rank and TPMI combination of [2 layers, TPMI=5] (where a codeword mapped (in another mapping) to an index of 5 is associated with a two-layer (i.e., a transmission rank of two) uplink transmission), an index of [29] may map to a transmission rank and TPMI combination of [3 layers, TPMI=2] (where a codeword mapped (in another mapping) to an index of 2 is associated with a three-layer (i.e., a transmission rank of three) uplink transmission), and the like (additional examples are provided in 3GPP TS 38.211, such as in Table 6.3.1.5-3, or TS 38.212, such as in Table 7.3.1.1.2-2). A particular mapping of indices to transmission rank and TPMI combinations that is to be used may be based at least in part on whether the UE 120 is capable of full coherence transmission (e.g., transmission using 4 antenna ports), partial coherence transmission (e.g., transmission using 2 antenna ports out of 4 antenna ports), or non-coherence transmission (e.g., transmission using 1 antenna port of 4 antenna ports).

In some aspects, the BS 110 may select the multiple precoder indicators from a set of precoder indicators. In some aspects, the BS 110 may select a first precoder indicator from the set of precoder indicators, and may select a second precoder indicator from a subset of the set of precoder indicators. For example, the set of precoder indicators may include all indices of a mapping (e.g., the mapping for SRI combinations or the mapping for transmission rank and TPMI combinations), and the subset of the set may include a subset of the indices of the mapping. In some aspects, the precoder indicators that are included in the subset from which the second precoder indicator is selected may be based at least in part on the first precoder indicator that is selected by the BS 110.

The first precoder indicator selected by the BS 110 may be associated with a particular transmission rank and/or a particular coherence type (e.g., full coherence, partial coherence, or non-coherence). In the case of the mapping for SRI combinations, the transmission rank may correspond to a quantity of SRIs included in an SRI combination. In the case of the mapping for transmission rank and TPMI combinations, the transmission rank is explicitly indicated. Moreover, a TPMI, of a transmission rank and TPMI combination, may be associated with a coherence type (e.g., a quantity of antenna ports).

Accordingly, the precoder indicators that are included in the subset from which the second precoder indicator is selected may be based at least in part on the particular transmission rank and/or the particular coherence type associated with the first precoder indicator selected by the BS 110. In other words, the second precoder indicator may be selected from a restricted group of precoder indicators that is dependent upon the selected first precoder indicator. In this way, the second precoder indicator may be identified using less bits (relative to the first precoder indicator)

because the subset is a restricted group of precoder indicators (relative to the set of precoder indicators).

In some aspects, the subset includes only the precoder indicators of the set that are associated with the particular transmission rank of the selected first precoder indicator. For example, the set may include precoder indicators associated with a transmission rank of 1, 2, 3, or 4, and the selected first precoder indicator may be associated with a transmission rank of 3. Accordingly, the subset may include only precoder indicators of the set that are associated with a transmission rank of 3.

In some aspects, the subset includes only the precoder indicators of the set that are associated with the particular transmission rank of the selected first precoder indicator, as described above, and the particular coherence type of the selected first precoder indicator. For example, the set may include precoder indicators associated with full coherence, partial coherence, or non-coherence, and the selected first precoder indicator may be associated with full coherence in a joint transmission scenario. Accordingly, the subset may include only precoder indicators of the set that are associated with full coherence.

In some aspects, the BS 110 may determine co-phasing factors to enable the UE 120 to generate a co-phased joint transmission using multiple antenna panels. The co-phasing factors may be for precoders of multiple layers that are to be transmitted by the UE 120 on an antenna panel of the multiple antenna panels. That is, a co-phasing factor may align a phase of a precoder for a layer on a first antenna panel with a phase of a precoder for the layer on a second antenna panel. In this way, the layer may be transmitted on the first antenna panel and the second antenna panel in a phase-aligned manner.

The co-phasing factors determined by the BS 110 may be associated with at least one co-phasing factor indicator. In some aspects, a co-phasing factor indicator may identify a single co-phasing factor. In some aspects, a co-phasing factor indicator may be an index value that identifies a plurality of co-phasing factors.

As shown by reference number 310, the BS 110 may transmit, and the UE 120 may receive, DCI that schedules uplink transmissions of the UE 120. For example, the DCI may schedule a joint transmission of the UE 120 using multiple antenna panels, such as a PUSCH communication in one or more layers on a first antenna panel of the UE 120 and a second antenna panel of the UE 120. In some aspects, the UE 120 may receive the DCI from a first TRP (e.g., associated with the BS 110), and the DCI may schedule an uplink multi-panel transmission to the first TRP and a second TRP (e.g., associated with the BS 110 or another BS). In some aspects, the UE 120 may receive the DCI from the BS 110, and the DCI may schedule an uplink multi-panel transmission to the BS 110 (e.g., in a coordinated manner).

In some aspects, the BS 110 may indicate that the DCI is scheduling a joint transmission for the UE 120 based at least in part on a configuration (e.g., a radio resource control (RRC) configuration) for the DCI. Similarly, the UE 120 may determine that the DCI is scheduling a joint transmission based at least in part on the configuration for the DCI. The configuration for the DCI may indicate a quantity of transmission configuration indicators (TCIs) configured for the DCI, a quantity of precoder indicators configured for the DCI, whether a co-phasing factor is configured for the DCI, and whether a frequency division multiplexing (FDM) indicator or a quantity of reserved bits is configured for the DCI.

In some aspects, the DCI may schedule a joint transmission when two TCIs are configured for the DCI, two precoder indicators are configured for the DCI, a co-phasing factor is configured for the DCI, and an FDM indicator is not configured for the DCI. In some aspects, the DCI may schedule a non-coherent joint transmission when two TCIs are configured for the DCI, two precoder indicators are configured for the DCI, a co-phasing factor is not configured for the DCI, and an FDM indicator is not configured for the DCI. In some aspects, the DCI may schedule a dynamic panel selection transmission when one TCI is configured for the DCI, one precoder indicator is configured for the DCI, a co-phasing factor is not configured for the DCI, and an FDM indicator is not configured for the DCI. In some aspects, the DCI may schedule a frequency division multiplexed joint transmission when two TCIs are configured for the DCI, two precoder indicators are configured for the DCI, a co-phasing factor is not configured for the DCI, and an FDM indicator is configured for the DCI.

The DCI may identify (e.g., in the same field of the DCI) the multiple precoder indicators (e.g., the first precoder indicator and the second precoder indicator) selected by the BS 110. The second quantity of bits may be a quantity of bits needed to identify a particular precoder indicator of the subset from which the second precoder indicator is selected. For example, the DCI may identify a first TPMI index and a second TPMI index selected by the BS 110 in a TPMI field of the DCI. As another example, the DCI may identify a first SRI index and a second SRI index selected by the BS 110 in an SRI field of the DCI.

3GPP TS 38.211 specifies that, when transforming precoding is disabled for CP-OFDM in a single panel uplink transmission, a TPMI index, of TPMI indices associated with 4 antenna ports with different transmission ranks and/or different coherence types, may be indicated. Table 1 shows a quantity of bits needed to indicate a TPMI index for a single antenna panel:

TABLE 1

| Transmission Rank | Quantity of TPMI indices associated with full coherence | Quantity of TPMI indices associated with partial coherence | Quantity of TPMI indices associated with non-coherence | Total bits in DCI |
| --- | --- | --- | --- | --- |
| 1 | 16 | 8 | 4 | 5 bits |
| 2 | 8 | 8 | 6 | 6 bits |
| 3 | 4 | 2 | 1 | |
| 4 | 2 | 2 | 1 | |

The DCI may identify the first precoder indicator selected by the BS 110 using a first quantity of bits and the second precoder indicator selected by the BS 110 using a second quantity of bits that is less than (or in some cases equal to) the first quantity of bits. That is, in cases in which the second precoder indicator is selected from a restricted group of precoder indicators (relative to a group of precoder indicators from which the first precoder indicator is selected), a reduced quantity of bits of the DCI may be allocated to identify the second precoder indicator.

In some aspects, the DCI may identify the at least one co-phasing factor indicator selected by the BS 110. For example, the DCI may identify the at least one co-phasing factor indicator in the same field of the DCI that identifies the multiple precoder indicators selected by the BS 110. In some aspects, bits of the DCI that are not used (e.g., by reducing a quantity of bits needed to indicate the second precoder indicator, as described above) may be allocated or shared for indicating the at least one co-phasing factor indicator. In some aspects, the DCI may allocate a quantity of bits for the co-phasing factor indicator that corresponds to a transmission rank (e.g., a quantity of layers) associated with the second precoder indicator, as shown below in Tables 2-5.

In some aspects, the DCI may identify a single co-phasing factor indicator that identifies a single co-phasing factor. In this case, the UE 120 may use the single co-phasing factor indicator to determine multiple co-phasing factors, as described below. In some aspects, the DCI may identify multiple co-phasing factor indicators that identify multiple co-phasing factors. In some aspects, a single co-phasing factor indicator identified by the DCI may be an index value that identifies multiple co-phasing factors.

In some aspects, the first precoder indicator is a first TPMI index associated with any of full coherence, partial coherence, or non-coherence, and the second precoder indicator is a second TPMI index associated with full coherence (e.g., when the first precoder indicator is associated with full coherence) for joint transmission. In this case, the DCI may allocate a quantity of bits for identifying the first TPMI index, the second TPMI index, and the at least one co-phasing factor indicator as shown in Table 2 (DCI alignment is used to align a length of DCI under different transmission ranks to be the same):

TABLE 2

| Maximum Transmission Rank (TR) | First TPMI index bits | Second TPMI index bits | Co-phasing factor indicator bits | Total bits in DCI |
|---|---|---|---|---|
| 1 | 5 | 4 | 1 | 10 |
| 2, 3, or 4 | 6 | 4, if TR = 1 | 1 | 11 (with DCI alignment) |
|  |  | 3, if TR = 2 | 2 |  |
|  |  | 2, if TR = 3 | 3 |  |
|  |  | 1, if TR = 4 | 4 |  |

With reference to Table 2, when a maximum transmission rank is 2, 3, or 4, a total of 11 bits in DCI may be used to indicate the first TPMI index, the second TPMI index, and the co-phasing factor indicator(s). Among the 11 bits, 6 bits may be used to indicate the first TPMI index, and the remaining 5 bits may be used (e.g., shared) to indicate the second TPMI index and the co-phasing factor indicator(s). As an example, when a transmission rank of the first TPMI index is 1, the first 4 bits, of the remaining 5 bits, may used to indicate the second TPMI index with full coherence and of the same transmission rank as the first TPMI, and the last 1 bit, of the remaining 5 bits, may be used to indicate a co-phasing factor for one layer. As another example, when a transmission rank of the first TPMI index is 2, the first 3 bits, of the remaining 5 bits, may be used to indicate the second TPMI index, and the last 2 bits, of the remaining 5 bits may be used to indicate co-phasing factors for two layers. As a further example, when a transmission rank of the first TPMI index is 3, the first 2 bits, of the remaining 5 bits, may be used to indicate the second TPMI index, and the last 3 bits, of the remaining 5 bits, may be used to indicate co-phasing factors for three layers. As an additional example, when a transmission rank of the first TPMI index is 4, the first 1 bit, of the remaining 5 bits, may be used to indicate the second TPMI index, and the last 4 bits, of the remaining 5 bits, may be used to indicate co-phasing factors for four layers. In this way, at least 1 bit of the DCI may be used to indicate a co-phasing factor for each layer.

In some aspects, the first precoder indicator is a first TPMI index associated with full coherence, partial coherence, or non-coherence, and the second precoder indicator is a second TPMI index associated with full coherence or partial coherence. In this case, the DCI may allocate a quantity of bits for identifying the first TPMI index, the second TPMI index, and the at least one co-phasing factor indicator as shown in Table 3:

TABLE 3

| Maximum Transmission Rank (TR) | First TPMI index bits | Second TPMI index bits | Co-phasing factor indicator bits | Total bits in DCI |
|---|---|---|---|---|
| 1 | 5 | 5 | 1 | 11 |
| 2, 3, or 4 | 6 | 5, if TR = 1 | 1 | 12 (with DCI alignment) |
|  |  | 4, if TR = 2 | 2 |  |
|  |  | 3, if TR = 3 | 3 |  |
|  |  | 2, if TR = 4 | 4 |  |

In some aspects, the first precoder indicator is a first TPMI index associated with partial coherence or non-coherence, and the second precoder indicator is a second TPMI index associated with partial coherence. In this case, the DCI may allocate a quantity of bits for identifying the first TPMI index, the second TPMI index, and the at least one co-phasing factor indicator as shown in Table 4:

TABLE 4

| Maximum Transmission Rank (TR) | First TPMI index bits | Second TPMI index bits | Co-phasing factor indicator bits | Total bits in DCI |
|---|---|---|---|---|
| 1 | 4 | 3 | 1 | 8 |
| 2, 3, or 4 | 5 | 3, if TR = 1 | 1 | 10 (with DCI alignment) |
|  |  | 3, if TR = 2 | 2 |  |
|  |  | 1, if TR = 3 | 3 |  |
|  |  | 1, if TR = 4 | 4 |  |

In some aspects, the first precoder indicator is a first SRI index and the second precoder indicator is a second SRI index. In this case, the DCI may allocate a quantity of bits for identifying the first SRI index, the second SRI index, and the at least one co-phasing factor indicator as shown in Table 5:

TABLE 5

| Maximum quantity of layers (L, corresponding to maximum transmission rank (TR)), Quantity of configured SRSs (N) in an SRS set for non-codebook based MIMO | First SRI index bits | Second SRI index bits | Co-phasing factor indicator bits | Total bits in DCI |
|---|---|---|---|---|
| L = 1, N = 2 | 1 | 1 | 1 | 3 |
| L = 2, N = 2 | 2 | 1, if TR = 1 | 1 | 4 |
|  |  | 0, if TR = 2 | 2 |  |
| L = 1, N = 3 | 2 | 2 | 1 | 5 |
| L = 2, N = 3 | 3 | 2, if TR = 1 | 1 | 7 |
|  |  | 2, if TR = 2 | 2 |  |
| L = 3, N = 3 | 3 | 2, if TR = 1 | 1 | 7 |
|  |  | 2, if TR = 2 | 2 |  |
|  |  | 0, if TR = 3 | 3 |  |
| L = 1, N = 4 | 2 | 2 | 1 | 5 |
| L = 2, N = 4 | 4 | 2, if TR = 1 | 1 | 9 |
|  |  | 3, if TR = 2 | 2 |  |
| L = 3, N = 4 | 4 | 2, if TR = 1 | 1 | 9 |
|  |  | 3, if TR = 2 | 2 |  |
|  |  | 2, if TR = 3 | 3 |  |

TABLE 5-continued

| Maximum quantity of layers (L, corresponding to maximum transmission rank (TR)), Quantity of configured SRSs (N) in an SRS set for non-codebook based MIMO | First SRI index bits | Second SRI index bits | Co-phasing factor indicator bits | Total bits in DCI |
|---|---|---|---|---|
| L = 4, N = 4 | 4 | 2, if TR = 1<br>3, if TR = 2<br>2, if TR = 3<br>0, if TR = 4 | 1<br>2<br>3<br>4 | 9 |

As shown by reference number 315, the UE 120 may determine precoders for multiple antenna panels based at least in part on the DCI. That is, the UE 120 may determine the precoders for the multiple antenna panels based at least in part on the multiple precoder indicators (e.g., the first precoder indicator and the second precoder indicator) and the at least one co-phasing factor indicator identified by the DCI. In some aspects, the UE 120 may determine co-phasing factors for precoders of one or more layers that are to be transmitted on an antenna panel based at least in part on the at least one co-phasing factor indicator identified by the DCI.

For example, if the DCI identifies a single co-phasing factor indicator that identifies a single co-phasing factor, the UE 120 may determine one or more additional co-phasing factors based at least in part on the single co-phasing factor. In this case, the UE 120 may use a co-phasing shifting function to determine additional co-phasing factors based at least in part on the single co-phasing factor. For example, the UE 120 may determine one or more additional co-phasing factors according to Equation 1:

$$c_{l,n} = (-1)^{f(l)} e^{jg(n)} \qquad \text{Equation 1}$$

where $c_{l,n}$ represents a co-phasing factor for a layer l, f(l) represents a co-phasing shifting function for layer l, g(n) represents the single co-phasing factor identified by the DCI, and e (2.71828) and j($\sqrt{-1}$) are constant values.

As another example, if the DCI identifies multiple co-phasing factor indicators that identify multiple co-phasing factors, the UE 120 may identify co-phasing factors for multiple layers based at least in part on the multiple co-phasing factor indicators. In this case, the co-phasing factors for the multiple layers may be represented by Equation 2:

$$c_{l,n} = e^{jg(l,n)} \qquad \text{Equation 2}$$

where $c_{l,n}$ represents a co-phasing factor for a layer l, g(l, n) represents a co-phasing factor identified by the DCI for layer l, and e and j are constant values, as described above. For example, g(l, n) may be {0, pi} or $c_{l,n}$ may be {1, −1}.

As a further example, the DCI may identify a single co-phasing factor indicator that is an index value. In this case, the UE 120 may determine one or more co-phasing factors based at least in part on the index value. For example, the UE 120 may be configured with a mapping of index values to arrays of co-phasing factors, and the UE 120 may identify an array of co-phasing factors from the mapping according to the index value identified by the DCI. An array of co-phasing factors may be represented by Equation 3:

$$c_n = [c_{1,n}, c_{2,n}, \ldots c_{L,n}] \qquad \text{Equation 3}$$

where $c_n$ represents an index value identified by the DCI, $c_{l,n}$ represents a co-phasing factor for layer 1, $c_{2,n}$ represents a co-phasing factor for layer 2, and $c_{L,n}$ represents a co-phasing factor for a layer L.

In some aspects, the UE 120 may determine precoders for layers that are to be transmitted on a first antenna panel based at least in part on the first precoder indicator. In some aspects, the UE 120 may determine precoders for layers that are to be transmitted on a second antenna panel based at least in part on the second precoder indicator and the at least one co-phasing factor indicator. In other words, the UE 120 may determine precoders, that are not phase aligned, for multiple antenna panels based at least in part on the first precoder indicator and the second precoder indicator, as represented by Equation 4:

$$P = \begin{bmatrix} v_1^A v_2^A \ldots v_L^A \\ v_1^B v_2^B \ldots v_L^B \end{bmatrix} \qquad \text{Equation 4}$$

where P represents a matrix of precoders, $v_1^A$ represents a precoder for layer 1 on antenna panel A, $v_2^A$ represents a precoder for layer 2 on antenna panel A, $v_L^A$ represents a precoder for layer L on antenna panel A, $v_1^B$ represents a precoder for layer 1 on antenna panel B, $v_2^B$ represents a precoder for layer 2 on antenna panel B, and $v_L^B$ represents a precoder for layer L on antenna panel B. In this example, the first precoder indicator may identify precoders for antenna panel A and the second precoder indicator may identify precoders for antenna panel B.

Based at least in part on the precoders that are not phase aligned (e.g., according to Equation 4), the UE 120 may determine precoders, that are phase aligned, for the multiple antenna panels based at least in part on the determined co-phasing factors, as represented by Equation 5:

$$P = \begin{bmatrix} v_1^A & v_2^A & \ldots & v_L^A \\ c_{1,n} v_1^B & c_{2,n} v_2^B & \ldots & c_{L,n} v_L^B \end{bmatrix} \qquad \text{Equation 5}$$

where P, $v_1^A$, $v_2^A$, $v_L^A$, $v_1^B$, $v_2^B$, and $v_L^B$ are as described above, $c_{1,n}$ represents a co-phasing factor for layer 1, $c_{2,n}$ represents a co-phasing factor for layer 2, and $c_{L,n}$ represents a co-phasing factor for layer L. Thus, in this example, the precoders for antenna panel B may be combined with the determined co-phasing factors to derive new precoders that are phase-aligned with the precoders for antenna panel A.

As shown by reference number 320, the UE 120 may communicate by joint transmission with the BS 110 using multiple antenna panels based at least in part on the determined precoders. For example, the UE 120 may concurrently transmit the same communication (e.g., multiple layers) on a first antenna panel (e.g., a first PUSCH transmission using a first beam that is formed based at least in part on the precoders for the first antenna panel) and a second antenna panel (e.g., a second PUSCH transmission using a second beam that is formed based at least in part on the precoders for the second antenna panel) based at least in part on the determined precoders. In some aspects, the UE 120 may transmit to a first TRP (e.g., associated with the BS 110) using the first antenna panel and to a second TRP (e.g., associated with the BS 110 or another BS) using the second antenna panel. In some aspects, the UE 120 may transmit the communication to the BS 110 using the first antenna panel and the second panel in a phase aligned manner. In this way, the communication may be transmitted with greater signal strength.

As indicated above, FIG. 3 is provided as an example. Other examples may differ from what is described with respect to FIG. 3.

Figure 4:
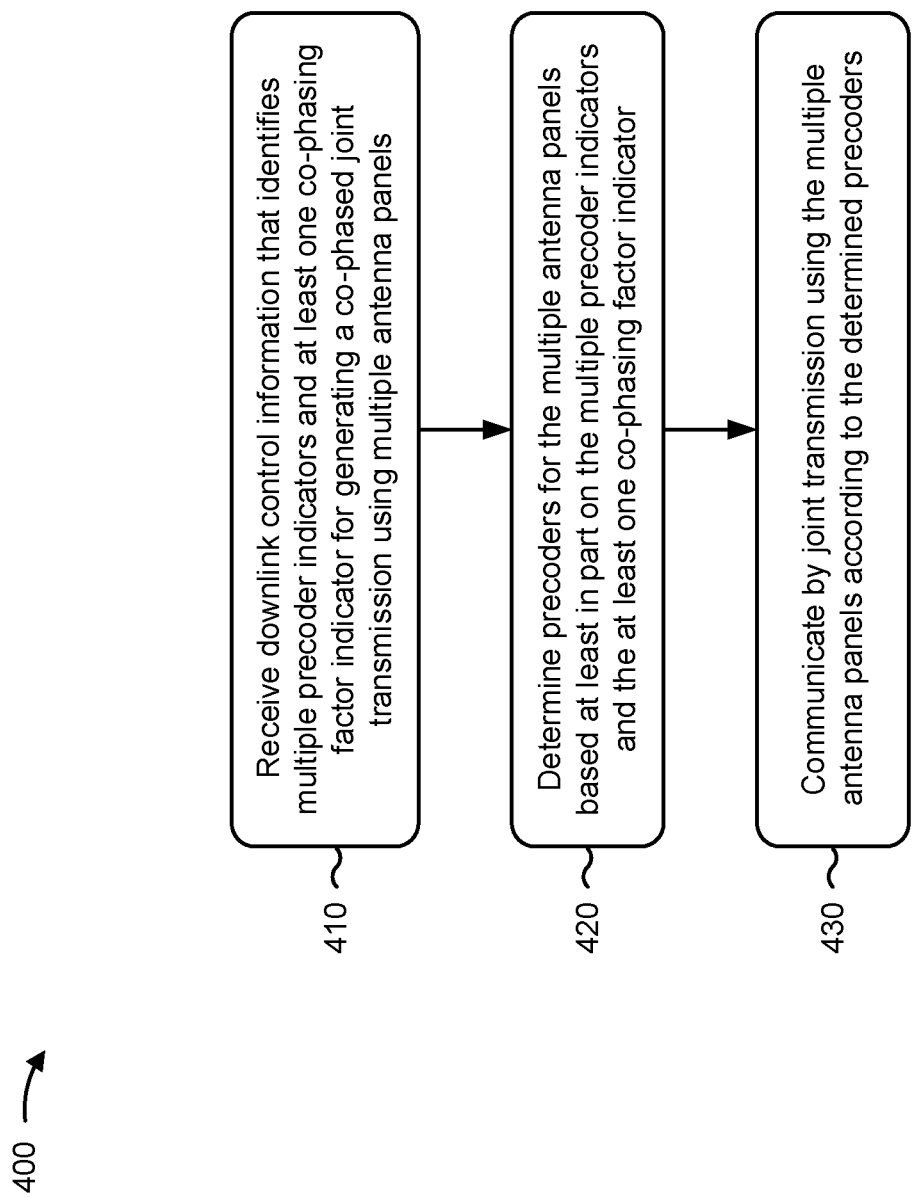
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120, and/or the like) performs operations associated with co-phasing factor indication in DCI.

As shown in FIG. 4, in some aspects, process 400 may include receiving DCI that identifies multiple precoder indicators and at least one co-phasing factor indicator for generating a co-phased joint transmission using multiple antenna panels (block 410). For example, the UE (e.g., using antenna 252, DEMOD 254, MIMO detector 256, receive processor 258, controller/processor 280, and/or the like) may receive DCI that identifies multiple precoder indicators and at least one co-phasing factor indicator for generating a co-phased joint transmission using multiple antenna panels, as described above.

As further shown in FIG. 4, in some aspects, process 400 may include determining precoders for the multiple antenna panels based at least in part on the multiple precoder indicators and the at least one co-phasing factor indicator (block 420). For example, the UE (e.g., using controller/processor 280, and/or the like) may determine precoders for the multiple antenna panels based at least in part on the multiple precoder indicators and the at least one co-phasing factor indicator, as described above.

As further shown in FIG. 4, in some aspects, process 400 may include communicating by joint transmission using the multiple antenna panels according to the determined precoders (block 430). For example, the UE (e.g., using controller/processor 280, transmit processor 264, TX MIMO processor 266, MOD 254, antenna 252, and/or the like) may communicate by joint transmission using the multiple antenna panels according to the determined precoders, as described above.

Process 400 may include additional aspects, such as any single aspect or any combination of aspects described below and/or in connection with one or more other processes described elsewhere herein.

In a first aspect, process 400 includes determining co-phasing factors for precoders of multiple layers that are to be transmitted on an antenna panel based at least in part on a single co-phasing factor indicator identified by the DCI. In a second aspect, alone or in combination with the first aspect, the DCI identifies respective co-phasing factor indicators that identify co-phasing factors for precoders of multiple layers that are to be transmitted on an antenna panel. In a third aspect, alone or in combination with one or more of the first and second aspects, the at least one co-phasing factor indicator is an index value that identifies respective co-phasing factors for precoders of multiple layers that are to be transmitted on an antenna panel.

In a fourth aspect, alone or in combination with one or more of the first through third aspects, the DCI identifies the at least one co-phasing factor indicator in a same field of the DCI that identifies the multiple precoder indicators. In a fifth aspect, alone or in combination with one or more of the first through fourth aspects, the multiple precoder indicators identify transmission rank and TPMI combinations or SRI combinations.

In a sixth aspect, alone or in combination with one or more of the first through fifth aspects, the multiple precoder indicators include a first precoder indicator selected from a set of precoder indicators and a second precoder indicator selected from a subset of the set of precoder indicators. In a seventh aspect, alone or in combination with one or more of the first through sixth aspects, the set includes precoder indicators associated with full coherence, partial coherence, and non-coherence, and the subset includes only the precoder indicators of the set associated with full coherence.

In an eighth aspect, alone or in combination with one or more of the first through seventh aspects, process 400 includes determining that communication is by joint transmission based at least in part on a quantity of TCIs configured for the DCI, a quantity of precoder indicators configured for the DCI, whether a co-phasing factor is configured for the DCI, and whether an FDM indicator is configured for the DCI.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
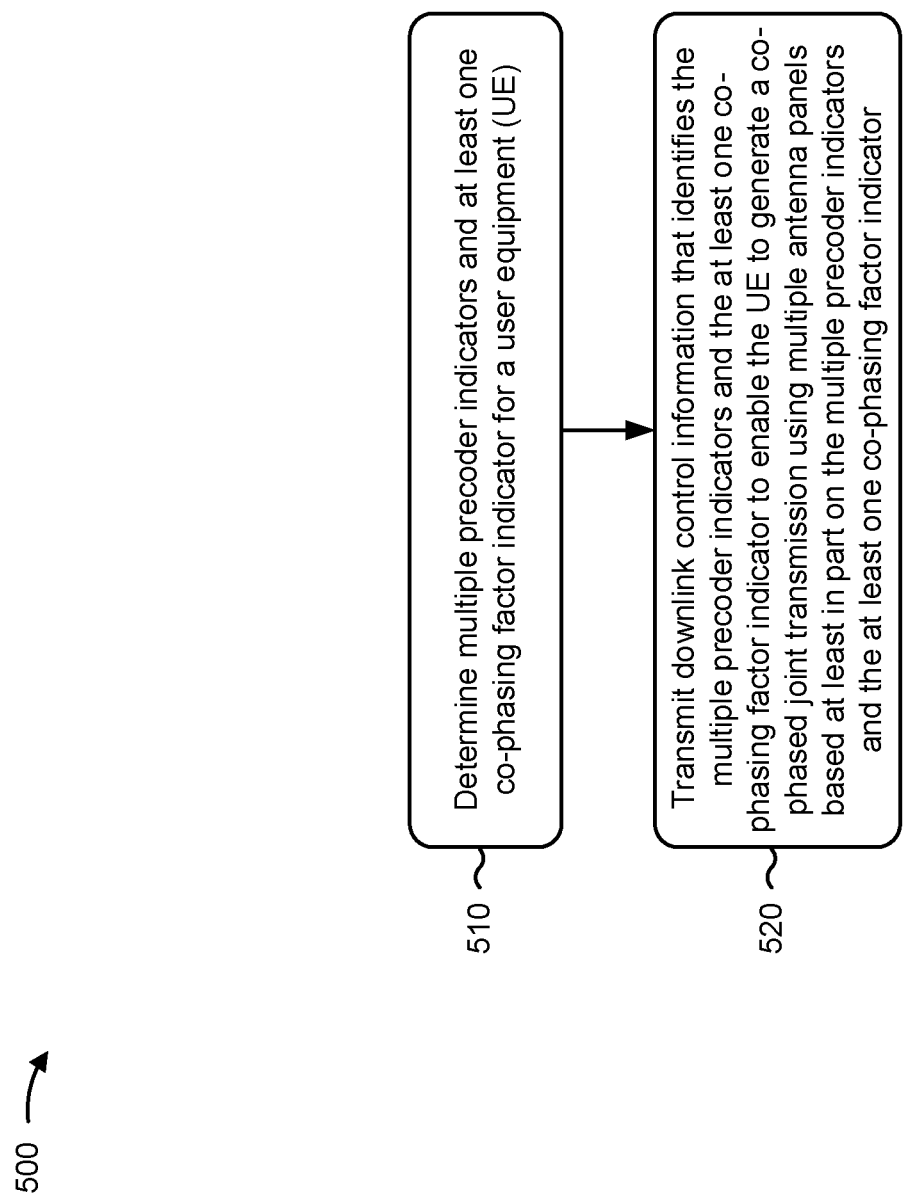
FIG. 5 is a diagram illustrating an example process performed, for example, by a BS, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110, and/or the like) performs operations associated with co-phasing factor indication in DCI.

As shown in FIG. 5, in some aspects, process 500 may include determining multiple precoder indicators and at least one co-phasing factor indicator for a UE (block 510). For example, the BS (e.g., using controller/processor 240, and/or the like) may determine multiple precoder indicators and at least one co-phasing factor indicator for a UE, as described above.

As further shown in FIG. 5, in some aspects, process 500 may include transmitting DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator (block 520). For example, the BS (e.g., using controller/processor 240, transmit processor 220, TX MIMO processor 230, MOD 232, antenna 234, and/or the like) may transmit DCI that identifies the multiple precoder indicators and the at least one co-phasing factor indicator to enable the UE to generate a co-phased joint transmission using multiple antenna panels based at least in part on the multiple precoder indicators and the at least one co-phasing factor indicator, as described above.

Process 500 may include additional aspects, such as any single aspect or any combination of aspects described below and/or in connection with one or more other processes described elsewhere herein.

In a first aspect, the DCI identifies a single co-phasing factor indicator that enables the UE to determine co-phasing factors for precoders of multiple layers that are to be transmitted by the UE on an antenna panel. In a second aspect, alone or in combination with the first aspect, the DCI identifies respective co-phasing factor indicators that identify co-phasing factors for precoders of multiple layers that are to be transmitted by the UE on an antenna panel. In a third aspect, alone or in combination with one or more of the first and second aspects, the at least one co-phasing factor indicator is an index value that identifies respective co-phasing factors for precoders of multiple layers that are to be transmitted by the UE on an antenna panel.

In a fourth aspect, alone or in combination with one or more of the first through third aspects, the DCI identifies the at least one co-phasing factor indicator in a same field of the DCI that identifies the multiple precoder indicators. In a fifth aspect, alone or in combination with one or more of the first through fourth aspects, the multiple precoder indicators identify transmission rank and TPMI combinations or SRI combinations.

In a sixth aspect, alone or in combination with one or more of the first through fifth aspects, the multiple precoder indicators include a first precoder indicator selected from a set of precoder indicators and a second precoder indicator selected from a subset of the set of precoder indicators. In a seventh aspect, alone or in combination with one or more of the first through sixth aspects, the set includes precoder indicators associated with full coherence, partial coherence, and non-coherence, and the subset includes only the precoder indicators of the set associated with full coherence.

In an eighth aspect, alone or in combination with one or more of the first through seventh aspects, process 500 includes indicating that communication of the UE is by joint transmission based at least in part on configuring a particular quantity of transmission configuration indicators for the DCI, configuring a particular quantity of precoder indicators for the DCI, selectively configuring a co-phasing factor for the DCI, and selectively configuring an FDM indicator for the DCI.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a user equipment (UE), comprising:
   receiving downlink control information (DCI) that identifies multiple precoder indicators and at least one co-phasing factor indicator for generating a co-phased joint transmission via multiple antenna panels; and
   communicating the co-phased joint transmission via the multiple antenna panels according to precoders for the multiple antenna panels, the precoders based at least in part on the multiple precoder indicators and the at least one co-phasing factor indicator.

2. The method of claim 1, further comprising:
   determining co-phasing factors for precoders of multiple layers that are to be transmitted on an antenna panel of the multiple antenna panels based at least in part on a single co-phasing factor indicator identified by the DCI.

3. The method of claim 1, wherein the DCI identifies co-phasing factor indicators that each identify respective co-phasing factors for precoders of multiple layers that are to be transmitted on an antenna panel of the multiple antenna panels.

4. The method of claim 1, wherein the at least one co-phasing factor indicator is an index value that identifies respective co-phasing factors for precoders of multiple layers that are to be transmitted on an antenna panel of the multiple antenna panels.

5. The method of claim 1, wherein the DCI identifies the at least one co-phasing factor indicator in a same field of the DCI that identifies the multiple precoder indicators.

6. The method of claim 1, wherein the multiple precoder indicators identify transmission rank and transmit precoder matrix indicator combinations or sounding reference signal resource indicator combinations.

7. A method of wireless communication performed at a network entity, comprising:
   transmitting downlink control information (DCI) that identifies multiple precoder indicators and at least one co-phasing factor indicator for a co-phased joint transmission; and
   receiving the co-phased joint transmission that is based at least in part on the multiple precoder indicators and the at least one co-phasing factor indicator.

8. The method of claim 7, wherein the DCI identifies a single co-phasing factor indicator that indicates co-phasing factors for precoders of multiple layers.

9. The method of claim 7, wherein the DCI identifies co-phasing factor indicators that each identify respective co-phasing factors for precoders of multiple layers.

10. The method of claim 7, wherein the at least one co-phasing factor indicator is an index value that identifies respective co-phasing factors for precoders of multiple layers.

11. The method of claim 7, wherein the DCI identifies the at least one co-phasing factor indicator in a same field of the DCI that identifies the multiple precoder indicators.

12. The method of claim 7, wherein the multiple precoder indicators identify transmission rank and transmit precoder matrix indicator combinations or sounding reference signal resource indicator combinations.

13. An apparatus for wireless communication at a user equipment (UE), comprising:
one or more memories; and
one or more processors, coupled to the one or more memories, configured to cause the UE to:
receive downlink control information (DCI) that identifies multiple precoder indicators and at least one co-phasing factor indicator to generate a co-phased joint transmission via multiple antenna panels; and
communicate the co-phased joint transmission via the multiple antenna panels according to precoders for the multiple antenna panels, the precoders based at least in part on the multiple precoder indicators and the at least one co-phasing factor indicator.

14. The apparatus of claim 13, wherein the one or more processors are further configured to cause the UE to:
determine co-phasing factors for precoders of multiple layers that are to be transmitted on an antenna panel of the multiple antenna panels based at least in part on a single co-phasing factor indicator identified by the DCI.

15. The apparatus of claim 13, wherein the DCI identifies co-phasing factor indicators that each identify respective co-phasing factors for precoders of multiple layers that are to be transmitted on an antenna panel of the multiple antenna panels.

16. The apparatus of claim 13, wherein the at least one co-phasing factor indicator is an index value that identifies respective co-phasing factors for precoders of multiple layers that are to be transmitted on an antenna panel of the multiple antenna panels.

17. The apparatus of claim 13, wherein the DCI identifies the at least one co-phasing factor indicator in a same field of the DCI that identifies the multiple precoder indicators.

18. The apparatus of claim 13, wherein the multiple precoder indicators identify transmission rank and transmit precoder matrix indicator combinations or sounding reference signal resource indicator combinations.

19. The apparatus of claim 13, wherein the multiple precoder indicators include a first precoder indicator selected from a set of precoder indicators and a second precoder indicator selected from a subset of the set of precoder indicators.

20. The apparatus of claim 19, wherein the set of precoder indicators includes precoder indicators associated with full coherence, partial coherence, and non-coherence, and the subset of the set of precoder indicators includes only the precoder indicators of the set associated with full coherence.

21. The apparatus of claim 13, wherein the one or more processors are further configured to cause the UE to:
determine that communication is via the co-phased joint transmission based at least in part on a quantity of transmission configuration indicators configured for the DCI, a quantity of precoder indicators configured for the DCI, whether a co-phasing factor is configured for the DCI, and whether a frequency division multiplexing indicator is configured for the DCI.

22. An apparatus for wireless communication at a network entity, comprising:
one or more memories; and
one or more processors, coupled to the one or more memories, configured to cause the network entity to:
transmit downlink control information (DCI) that identifies multiple precoder indicators and at least one co-phasing factor indicator for a co-phased joint transmission; and
receive the co-phased joint transmission that is based at least in part on the multiple precoder indicators and the at least one co-phasing factor indicator.

23. The apparatus of claim 22, wherein the DCI identifies a single co-phasing factor indicator that indicates co-phasing factors for precoders of multiple layers.

24. The apparatus of claim 22, wherein the DCI identifies co-phasing factor indicators that each identify respective co-phasing factors for precoders of multiple layers.

25. The apparatus of claim 22, wherein the at least one co-phasing factor indicator is an index value that identifies respective co-phasing factors for precoders of multiple layers.

26. The apparatus of claim 22, wherein the DCI identifies the at least one co-phasing factor indicator in a same field of the DCI that identifies the multiple precoder indicators.

27. The apparatus of claim 22, wherein the multiple precoder indicators identify transmission rank and transmit precoder matrix indicator combinations or sounding reference signal resource indicator combinations.

28. The apparatus of claim 22, wherein the multiple precoder indicators include a first precoder indicator selected from a set of precoder indicators and a second precoder indicator selected from a subset of the set of precoder indicators.

29. The apparatus of claim 28, wherein the set of precoder indicators includes precoder indicators associated with full coherence, partial coherence, and non-coherence, and the subset of the set of precoder indicators includes only the precoder indicators of the set associated with full coherence.

30. The apparatus of claim 22, wherein the one or more processors are further configured to cause the network entity to:
indicate that communication of a user equipment (UE) is via the co-phased joint transmission based at least in part on a configuration of a particular quantity of transmission configuration indicators for the DCI, a configuration of a particular quantity of precoder indicators for the DCI, a selective configuration of a co-phasing factor for the DCI, and a selective configuration of a frequency division multiplexing indicator for the DCI.

31. A non-transitory computer-readable medium storing a set of instructions for wireless communication, the set of instructions comprising:
one or more instructions that, when executed by one or more processors of a user equipment (UE), cause the UE to:
receive downlink control information (DCI) that identifies multiple precoder indicators and at least one co-phasing factor indicator to generate a co-phased joint transmission via multiple antenna panels; and
communicate the co-phased joint transmission via the multiple antenna panels according to precoders for the multiple antenna panels, the precoders based at least in part on the multiple precoder indicators and the at least one co-phasing factor indicator.

32. A non-transitory computer-readable medium storing a set of instructions for wireless communication, the set of instructions comprising:
one or more instructions that, when executed by one or more processors of a network entity, cause the network entity to:
transmit downlink control information (DCI) that identifies multiple precoder indicators and at least one co-phasing factor indicator for a co-phased joint transmission; and
receive the co-phased joint transmission that is based at least in part on the multiple precoder indicators and the at least one co-phasing factor indicator.

33. An apparatus for wireless communication at a user equipment (UE), comprising:
one or more memories; and
one or more processors, coupled to the one or more memories, configured to cause the UE to:
receive downlink control information (DCI) that identifies multiple precoder indicators and at least one co-phasing factor indicator to generate a co-phased joint transmission via multiple antenna panels; and
communicate the co-phased joint transmission via the multiple antenna panels according to precoders for the multiple antenna panels, the precoders based at least in part on the multiple precoder indicators and the at least one co-phasing factor indicator,
wherein the DCI identifies co-phasing factor indicators, including the at least one co-phasing factor indicator, that each identify respective co-phasing factors for precoders of multiple layers that are to be transmitted on an antenna panel of the multiple antenna panels, or
wherein the at least one co-phasing factor indicator is an index value that identifies the co-phasing factors for precoders of multiple layers that are to be transmitted on the antenna panel of the multiple antenna panels.

34. The apparatus of claim 33, wherein the one or more processors are further configured to cause the UE to determine the co-phasing factors for precoders of multiple layers that are to be transmitted on the antenna panel of the multiple antenna panels based at least in part on a single co-phasing factor indicator identified by the DCI.

35. The apparatus of claim 33, wherein the DCI identifies the co-phasing factor indicators that each identify the respective co-phasing factors for precoders of multiple layers that are to be transmitted on the antenna panel of the multiple antenna panels.

36. The apparatus of claim 33, wherein the at least one co-phasing factor indicator is the index value that identifies the co-phasing factors for precoders of multiple layers that are to be transmitted on the antenna panel of the multiple antenna panels.

37. The apparatus of claim 33, wherein the DCI identifies the at least one co-phasing factor indicator in a same field of the DCI that identifies the multiple precoder indicators.

38. The apparatus of claim 33, wherein the multiple precoder indicators identify transmission rank and transmit precoder matrix indicator combinations, or identify sounding reference signal resource indicator combinations.

39. The apparatus of claim 33, wherein the multiple precoder indicators include a first precoder indicator selected from a set of precoder indicators and a second precoder indicator selected from a subset of the set of precoder indicators.

40. The apparatus of claim 39, wherein the set of precoder indicators includes precoder indicators associated with full coherence, partial coherence, and non-coherence, and the subset of the set of precoder indicators includes only the precoder indicators of the set associated with full coherence.

41. The apparatus of claim 33, wherein the one or more processors are further configured to cause the UE to:
determine that communication is via the co-phased joint transmission based at least in part on a quantity of transmission configuration indicators configured for the DCI, a quantity of precoder indicators configured for the DCI, whether a co-phasing factor is configured for the DCI, and whether a frequency division multiplexing indicator is configured for the DCI.

42. An apparatus for wireless communication at a network node, comprising:
one or more memories; and
one or more processors, coupled to the one or more memories, configured to cause the network node to:
transmit, for a user equipment (UE), downlink control information (DCI) that identifies multiple precoder indicators and at least one co-phasing factor indicator for a co-phased joint transmission; and
receive, for the UE, the co-phased joint transmission that is based at least in part on the multiple precoder indicators and the at least one co-phasing factor indicator,
wherein the DCI identifies co-phasing factor indicators that each identify respective co-phasing factors for precoders of multiple layers, or
wherein the at least one co-phasing factor indicator is an index value that identifies the co-phasing factors for precoders of multiple layers.

43. The apparatus of claim 42, wherein the DCI identifies a single co-phasing factor indicator that indicates the co-phasing factors for precoders of multiple layers.

44. The apparatus of claim 42, wherein the DCI identifies the co-phasing factor indicators that each identify the respective co-phasing factors for the precoders of the multiple layers.

45. The apparatus of claim 42, wherein the at least one co-phasing factor indicator is the index value that identifies the co-phasing factors for the precoders of the multiple layers.

46. The apparatus of claim 42, wherein the DCI identifies the at least one co-phasing factor indicator in a same field of the DCI that identifies the multiple precoder indicators.

47. The apparatus of claim 42, wherein the multiple precoder indicators identify transmission rank and transmit precoder matrix indicator combinations, or identify sounding reference signal resource indicator combinations.

48. The apparatus of claim 42, wherein the multiple precoder indicators include a first precoder indicator selected from a set of precoder indicators and a second precoder indicator selected from a subset of the set of precoder indicators.

49. The apparatus of claim 48, wherein the set of precoder indicators includes precoder indicators associated with full coherence, partial coherence, and non-coherence, and the subset of the set of precoder indicators includes only the precoder indicators of the set associated with full coherence.

50. The apparatus of claim 42, wherein the one or more processors are further configured to cause the network node to:

indicate that communication between the UE and the network node is via the co-phased joint transmission based at least in part on a configuration of a particular quantity of transmission configuration indicators for the DCI, a configuration of a particular quantity of precoder indicators for the DCI, a selective configuration of a co-phasing factor for the DCI, and a selective configuration of a frequency division multiplexing indicator for the DCI.

* * * * *